United States Patent [19]

Gellert

[11] Patent Number: 4,521,179
[45] Date of Patent: Jun. 4, 1985

[54] INJECTION MOLDING CORE RING GATE SYSTEM

[76] Inventor: Jobst U. Gellert, 7A Prince St., Georgetown, Ontario, Canada, L7G 2X1

[21] Appl. No.: 568,048

[22] Filed: Jan. 4, 1984

Related U.S. Application Data

[63] Continuation-in-part of Ser. No. 470,192, Feb. 28, 1983, abandoned.

[30] Foreign Application Priority Data

Feb. 24, 1983 [CA] Canada .................................. 422305

[51] Int. Cl.³ .............................. B29F 1/03; B29F 1/08
[52] U.S. Cl. ................................ 425/548; 264/328.15; 425/549; 425/552; 425/566
[58] Field of Search .................. 264/328.15; 425/566, 425/549, 564, 548, 552

[56] References Cited

U.S. PATENT DOCUMENTS

| | | | |
|---|---|---|---|
| 2,940,123 | 6/1960 | Beck et al. | 425/564 |
| 3,800,027 | 3/1974 | Tsutsumi | 425/160 |
| 4,125,352 | 11/1978 | Gellert | 425/566 |
| 4,268,240 | 5/1981 | Rees et al. | 425/566 |
| 4,279,582 | 7/1981 | Osuna-Diaz | 425/566 |
| 4,303,382 | 12/1981 | Gellert | 425/566 |

FOREIGN PATENT DOCUMENTS 61438 5/1980 Japan .................................. 425/566

OTHER PUBLICATIONS

Mold Masters Melt Conveying Technology with Master-Shot Nozzles: brochure, 22 pp., 1982 Georgetown, Ontario, Canada.

Primary Examiner—Jan Silbaugh
Assistant Examiner—Hubert C. Lorin
Attorney, Agent, or Firm—Riches, McKenzie & Herbert

[57] ABSTRACT

This invention relates to a movel core ring gated injection molding system. Pressurized melt from a molding machine flows through the system and into a cavity. A gate leading to the cavity and a bore in the movable mold platen are in alignment and of the same size to receive the head portion of the valve pin which extends from a reduced neck portion. Actuating mechanism drives the valve pin between a retracted closed position to an open position in which the reduced neck portion extends into the cavity. In the closed position, the head portion of the valve pin extends a considerable distance into the bore in the mold platen to provide sufficient cooling to rapidly cool the melt in the cavity adjacent the pin. In one embodiment, the valve pin has a hollow portion adjacent the neck portion to provide the valve pin with thermal separation between the hot melt and the cool mold platen. In another embodiment, the valve pin has a copper portion between the hollow portion and the tip end to promote cooling of the melt in the cavity.

12 Claims, 8 Drawing Figures

INJECTION MOLDING CORE RING GATE SYSTEM

This application is a continuation-in-part of U.S. patent application Ser. No. 470,192, filed Feb. 28, 1983, now abandoned.

BACKGROUND OF THE INVENTION

This invention relates to injection molding and more particularly to an improved injection molding valve gated system for making a product with an opening extending through it.

This type of gating in which the valve pin extends completely through the cavity is known as core ring gating. The opening through the product is the hole formed by the valve pin. A system for core ring gating is described in Japanese patent application No. 55061438. However, the system shown in Japanese patent application No. 55061438 does not provide for sufficient cooling of the valve pin or for thermal separation between the hot nozzle and the cooled movable mold platen, and the present invention is an improvement over that system.

In a core ring gated injection molding system, the head portion adjacent the tip or forward end of the valve pin which extends through the cavity is received in the cooled movable mold platen on the other side. However, when the cavity has filled and the valve pin is actuated to the closed position, if the valve pin has a large diameter, an excessive amount of heat flows along it to the melt in the cavity and to the movable mold platen on the other side. In other words, it is difficult to cool the head portion of the valve pin with the result that the system will not operate quickly enough and there may be unsatisfactory shrinkage of the molded product. While the extent of this problem depends to some degree upon the type of material being molded and the shape of the product, generally speaking, the larger the diameter of the valve pin, the greater the problem.

SUMMARY OF THE INVENTION

Accordingly, it is an object of the invention to at least partially overcome this problem by providing a system with a valve pin arrangement which provides for rapid cooling of the valve pin in the cavity area. Another object is to provide the valve pin with thermal separation between heat received from the hot nozzle and cooling from the cooled movable mold platen.

To this end, in one of its aspects, the invention provides an injection molding system for filling a cavity defined between a cavity plate and a cool movable mold platen with an opening therethrough, an elongated valve pin with a tip end which extends through a gate in the cavity plate leading to the cavity, through the cavity, and into a bore in the movable mold platen, the gate, the opening through the cavity, and the bore in the movable mold platen being in alignment and substantially equal in diameter, valve pin actuating mechanism which reciprocates the valve pin between a rearward closed position and a forward open position in which the valve pin extends further through the opening through the cavity, a melt passage which extends through a manifold and around the valve pin to convey pressurized melt from a molding machine to the gate, the valve pin having an elongated head portion adjacent the tip end which is substantially equal in diameter to the gate, the opening through the cavity, and the bore in the movable mold platen, and a reduced neck portion which extends past the gate in the open position to provide for the flow of pressurized melt into the cavity, with the improvement wherein the head portion of the valve pin extends a considerable distance into the bore in the movable mold platen in the retracted closed position to provide sufficient cooling from the cool mold platen to rapidly cool the melt in the cavity adjacent the valve pin.

Further objects and advantages of the invention will appear from the following description, taken together with the accompanying drawings.

DESCRIPTION OF THE PREFERRED EMBODIMENT

Figure 1:
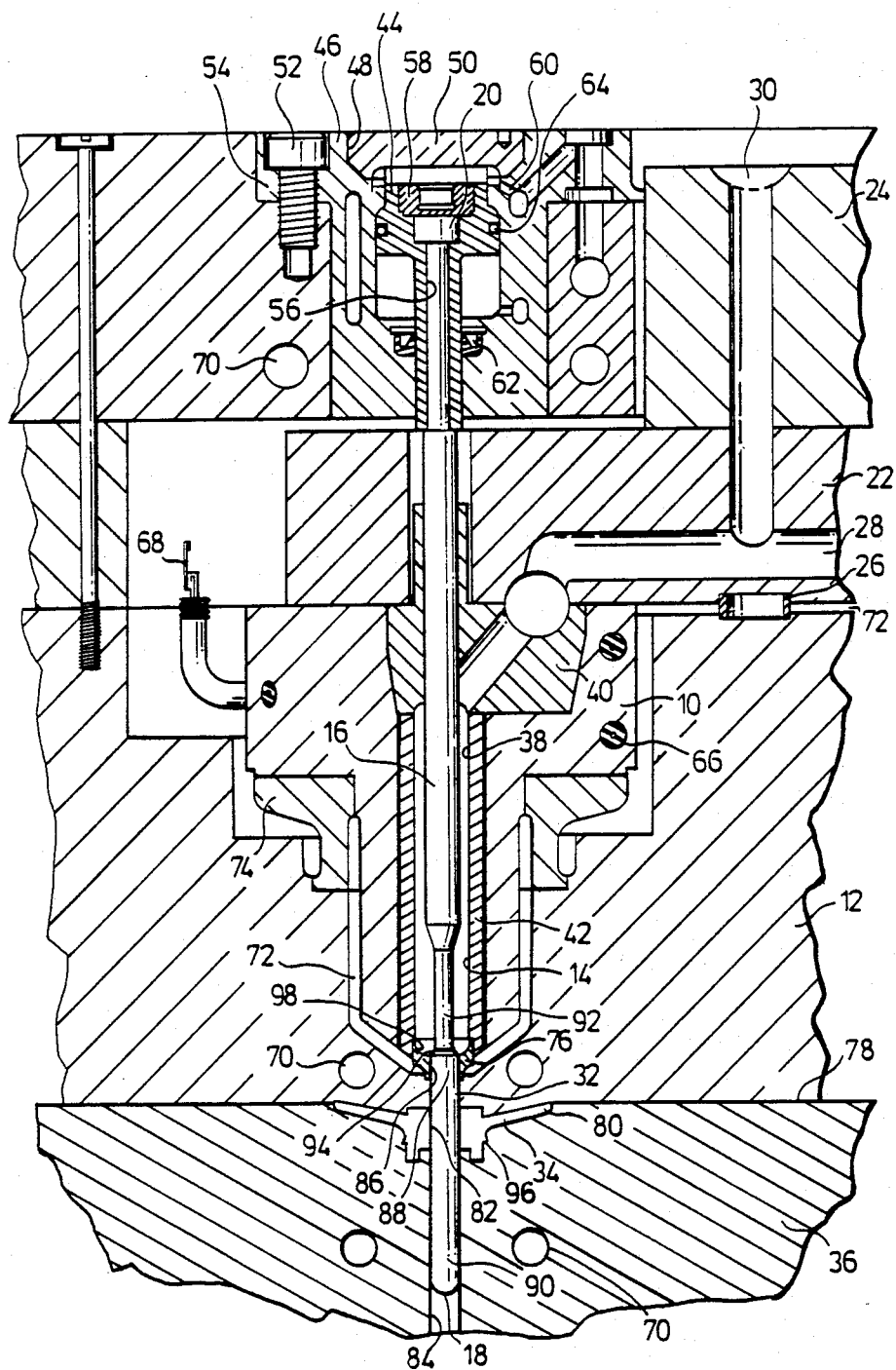
FIG. 1 is a sectional view of a portion of a valve gated molding system according to a first embodiment of the invention, showing the valve pin in the retracted closed position.

Reference is first made to FIG. 1 which shows one heated nozzle 10 of a multi-cavity hydraulically actuated valve gated injection molding system seated in a cavity plate 12. The heated nozzle 10 has a central bore 14 through which extends an elongated valve pin 16 which has a tip end 18 and a driven end 20. A manifold 22 extends between the heated nozzle 10 and a back plate 24 and is positioned relative to the cavity plate 12 by a locating ring 26. A melt passage 28 branches out from a recessed inlet 30 which receives the molding machine (not shown) and extends through the heated nozzle 10 to a gate 32 through a land 33 in the cavity plate 12 which leads to the cavity 34 defined between the cavity plate 12 and the movable mold platen 36. As may be seen, the melt passage 28 extends around the valve pin 16 in an enlarged portion 38 of the bore 14 through the heated nozzle 10. In this embodiment, the melt passage 28 joins the bore 14 in a stainless steel bushing seal 40 which is seated in the heated nozzle 10, as described in the applicant's U.S. Pat. No. 4,026,518 entitled "Bushing Seal for Valve-Gated Injection Mold" which issued May 31, 1977. The heated nozzle 10 is formed primarily of a beryllium copper alloy, but has a corrosion resistant inner portion formed of stainless steel.

The valve pin 16 which is formed of H13 steel is driven by a hydraulic actuating mechanism seated in the back plate 24. It includes a hydraulically driven piston 44 which reciprocates in a cylinder 46. The cylinder 46 is seated in an opening in the back plate 24 in alignment with the valve pin 16 and has a threaded mouth 48 with a circular cap 50 for removal of the piston 44. The cylinder 46 is secured in position by bolts 52 which extend through a collar portion 54 and into the back plate 24. The valve pin 16 extends through a central hole 56 in the piston 44 and a plug 58 is then screwed in against the enlarged head or driven end 20 of the valve pin to seal against an oil leak and securely attach it to the piston.

The piston 44 is driven by applying a controlled source of pressurized hydraulic fluid (not shown) to opposite sides of the piston through fluid ducts 60. A V-shaped flexible ring 62 seated in the cylinder 46 provides a high temperature seal around the piston 44 to prevent leakage of the hydraulic fluid. Several O-rings 64 are also provided to prevent leakage of the hydraulic fluid.

The nozzle 10 is heated by an electric heating element 66 which is cast into it and which receives power from a source (not shown) through terminals 68. This is, of course, controlled to substantially maintain the melt flowing through the melt passage 28 at a desired temperature. On the other hand, the back plate 24, the cavity plate 12 and the movable mold platen 36 are cooled by cooling elements 70. In order to avoid unacceptable heat transfer, the hot manifold 22 and nozzle 10 are separated from the cooled cavity plate 12 and back plate 24 by insulative air gaps 72 which are provided by the locating ring 26 and the insulation bushing 74 which supports the heated nozzle 10 in the cavity plate 12. A hollow nozzle seal 76 bridges the air gap 72 around the gate 32 which prevents the escape of pressurized melt into the air gap 72. The nozzle seal 76 is seated in the heated nozzle 10 and the cavity plate 12 which accurately locates the forward portion of the nozzle 10 with respect to the gate 32. The nozzle seal 76 is normally formed of a corrosion resistant and relatively poor conductive metal such as a titanium alloy and its shape will be described in more detail below.

Figure 2:
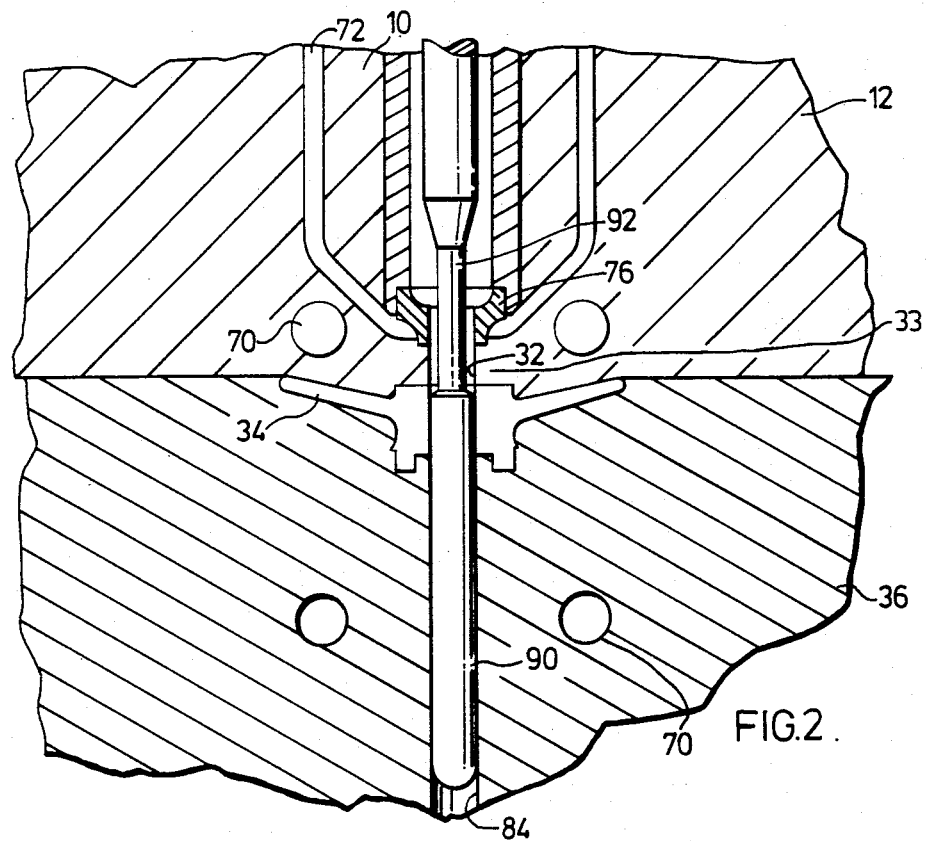
FIG. 2 is an enlarged sectional view of a smaller portion of the system seen in FIG. 1, showing the valve pin in the open position.

As may be seen, each cavity 34 is formed by the cavity plate 12 and the movable mold platen 36 which is opened along a parting line 78. In the particular example being illustrated, the product is a gear wheel 80 which is formed with a central gate hole 82 equal in diameter to the gate 32. The mold platen 78 also has a bore 84 which is of the same diameter and in alignment with the gate 32 and the central bore 14 of the heated nozzle 10. The nozzle seal 76 similarly has a cylindrical inner surface 86 which forms a bore 88 which is the same size and in alignment with the others to receive the valve pin 16. Referring to FIG. 2, it may be seen that the valve pin 16 has a cylindrical head portion 90 adjacent the tip end 18. The head portion 90 extends forwardly from a neck portion 92 with a reduced diameter which joins the head portion 90 at a shoulder 94. The head portion 90 extends through the nozzle seal 76, gate 32, cavity 34 and a considerable distance into the bore 84 of the cooled mold platen and is of a size to fit closely in them to prevent unacceptable leakage of the pressurized melt. As will be further described below, the cavity 34 is provided with a portion which forms a slightly undercut collar 96 on the product 81.

In use, following assembly of the system shown in FIGS. 1 and 2, electrical power is applied to the terminals 68 of the heating element 66 and the heated nozzle 10 is heated up to the desired operating temperature. Pressurized melt from the molding machine is introduced into the melt passage 28 and controlled hydraulic pressure is applied to the actuating mechanism according to a predetermined cycle in a conventional manner. When the valve pin 16 is driven forward to the open position shown in FIG. 2, with the neck portion 92 extending into the cavity 34, the melt flows through the nozzle seal 76 and the gate 32 around the reduced neck portion. It is, of course, preferable that the components of the system be shaped to eliminate any "dead spots" in the melt flow and to make the flow as smooth as possible. After sufficient melt has been injected into the cavity 34 to fill it, the high injection pressure is held for a short period of time to pack. The actuating mechanism then retracts the valve pin to the closed position shown in FIG. 1 in which the shoulder 94 of the valve pin 16 is approximately in line with the shoulder 98 formed at the rear of the inner surface 86 of the nozzle seal 76. As may be seen, in this position the hot melt which is held at the forward end of the melt passage 28 around the neck portion 92 of the valve pin 16 is thermally separated from the cooled cavity plate 12 by the nozzle seal 76 made of poorly conducting titanium. The thickness and shape of the nozzle seal 76 may be designed in conjuction with the selection of its material to optimize the amount of heat which flows through it from the heated nozzle 10 to the cavity plate 12.

After the melt in the cavity has cooled sufficiently, the mold is opened at the parting line 78, and the product 80 ejected. By way of example, for a typical application, the fill time could be approximately 1 second, the packing time approximately 3-4 seconds, and the cooling time approximately 12-15 seconds. It will be appreciated that it is very important that cycle time be kept to a minimum, and that the cooling time represents a considerable portion of the cycle. Furthermore, it is important to provide cooling to the inner portion of the part adjacent the valve pin as, in addition to reducing cooling time, this results in more uniform cooling of the part which assures dimensional integrity of the bore and also facilitates ejection. In fact, it is important to provide sufficient cooling in the inner portion of the cavity both during and after filling and packing as this avoids undue "shrinkage" of the product. If there is too much "shrinkage" during cooling or "after shrinkage" following ejection, the molded product will be of unacceptable quality. Thus, the present invention provides that the head portion 90 of the valve pin 16 extends into the bore 84 in the movable mold platen 36 a considerable distance even in the retracted closed position to provide for rapid cooling of the melt in the cavity 34 adjacent the valve pin 16 through the head portion 90 to the cool mold platen 36. It is apparent that there must be sufficient clearance of the head portion 90 of the valve pin 16 in the bore 84 in the mold platen and this reduces cooling. Therefore the area of contact between the head portion 90 and the bore 84 must be increased by lengthening the head portion 90 to increase the distance it extends into the bore. However, lengthening the head portion 90 has the accompanying disadvantage that ejection of the molded product is more difficult, in order to withdraw the molded product 80 from the valve pin 16 extending through it, it is of course necessary to overcome the forces between them. Thus, the cavity 34 is designed to form a slightly undercut collar 96 which holds the product 80 on the mold platen 36 as it separates from the cavity plate 12. Although the mold platen 36 is normally formed of a number of sections depending upon the configuration of the cavity, it is shown here as a single section for ease of illustration. Similarly, the ejector pins which eject the product 80 from the cavity 34 after it opens are not shown. The ejector pins apply enough force to the molded product 80 to sufficiently compress the undercut collar 96 and release the product from the mold platen 36. After the product has been ejected, the mold is closed again and the sequence is repeated. It is, of course, necessary that the system be sufficiently reliable to run continuously for a long period of time without a malfunction due to plugging or sticking, nor deterioration of the polymer of the product. This system, in which the stationary melt during the period when the valve pin is in the closed position is completely separated further from the cooled cavity plate, has been found to be very satisfactory in this regard.

Figure 3:
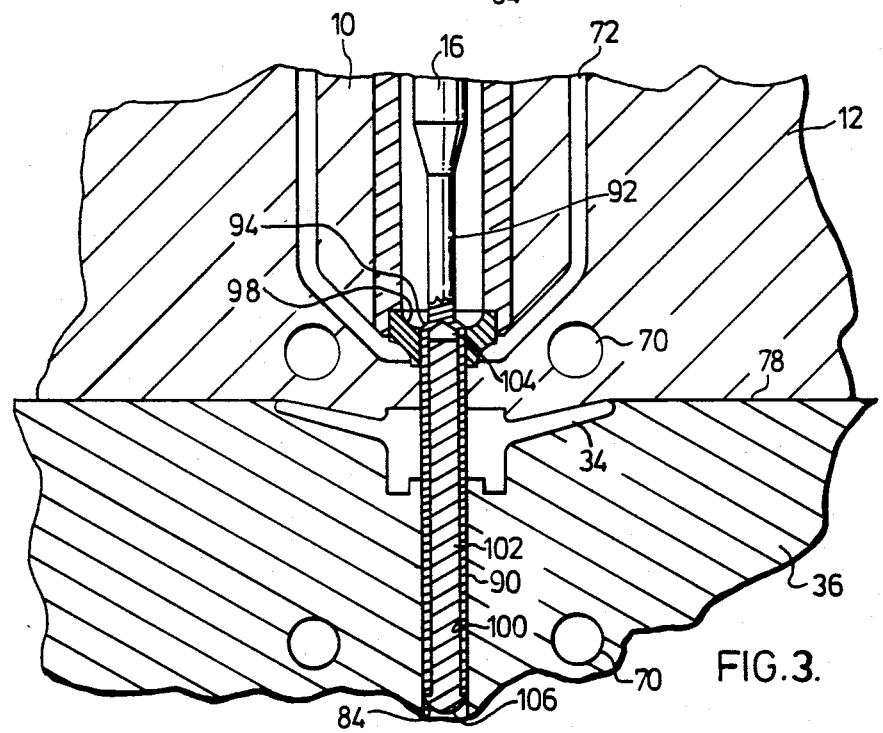
FIG. 3 is a similar view according to a second embodiment of the invention, showing the valve pin in the retracted closed position.
Figure 4:
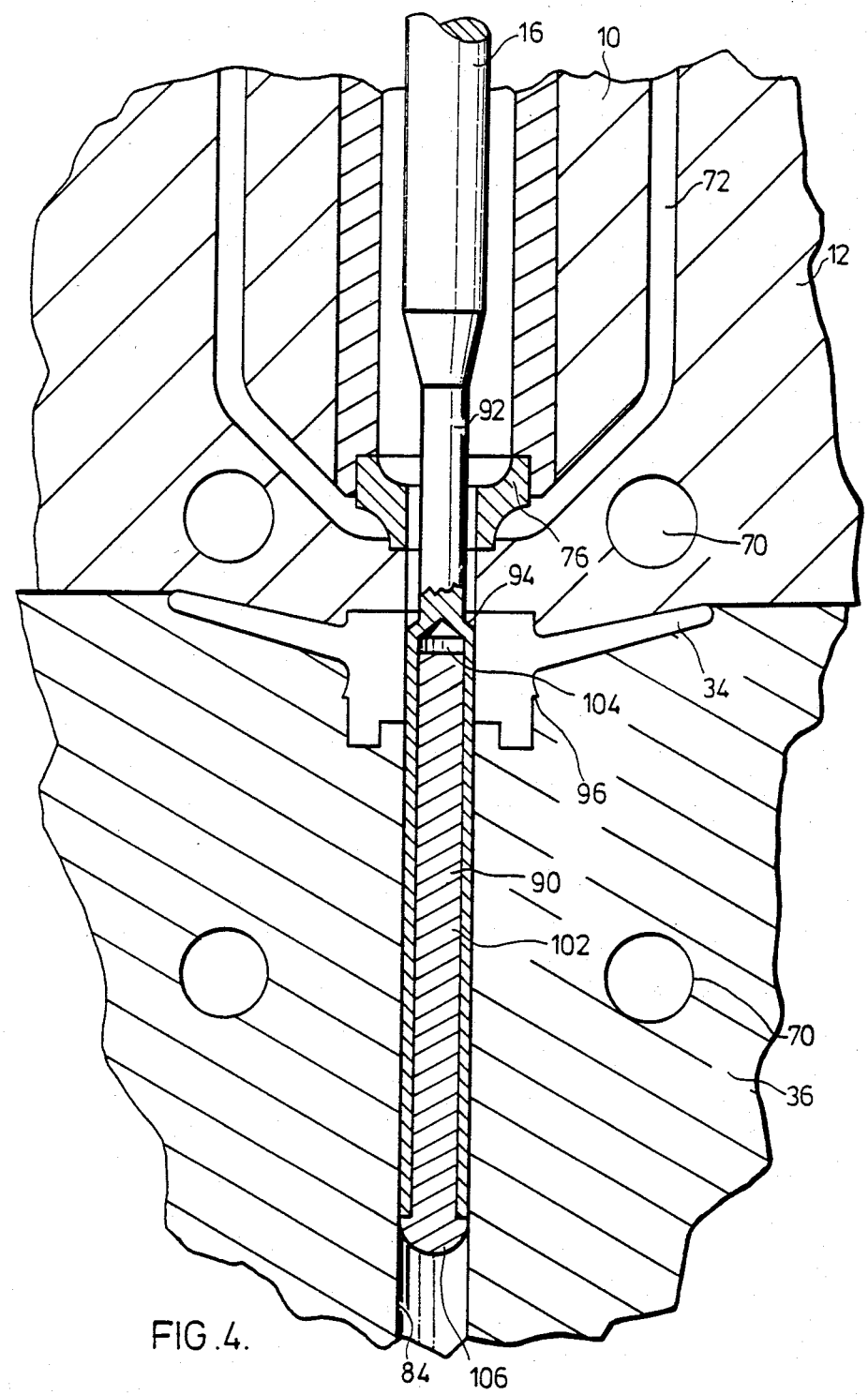
FIG. 4 is a further enlarged view of the system seen in FIG. 3, showing the valve pin in the open position.

FIGS. 3 and 4 illustrate another embodiment of the invention in which many items are the same as those of the first embodiment and are described and illustrated using the same reference numerals. In fact most of the structure and the operation of this embodiment is identical to that described above, and need not be repeated. The differences are that in this embodiment the head portion 90 of the valve pin 16 is formed with a hollow well 100 extending from the tip end 18 and a copper plug 102 is seated in it adjacent the tip end 18. This provides an insulative air space 104 adjacent the neck portion 92 of the valve pin 16. While, in this embodiment, the plug 102 is heat seated in the well 100 and is shown as having a head 106 which locates it in the well and determines the length of air space 104, it is apparent other structures and other highly conductive metals could be used. In fact, the plug 102 could be formed of the same metal as the valve pin 16.

In use, the air space 104 provides the valve pin with greater thermal separation between the hot nozzle 10 and the cool cavity plate 12 and mold platen 36. Thus, in the open position shown in FIG. 4, the hot neck portion 92 of the valve pin 16 extends down into a portion of the cavity 34 to facilitate filling, but the air space 104 insulates this from the cooling effect of the copper plug 102. On the other hand, the higher conductivity of the plug 102 results in more rapid cooling of the melt in the cavity adjacent the valve pin, but the air space 104 prevents excessive heat loss from the neck portion 92. In the closed position shown in FIG. 3, the thermal separation provided by the air space occurs in the area where the hot melt is separated from the cooled cavity plate 12. While the relative sizes of the plug 102 and the air space 104 may be adjusted for different applications and materials, this arrangement is particularly advantageous for large diameter valve pins, for example where the diameter of the head portion 90 is greater than one half inch.

Figure 5:
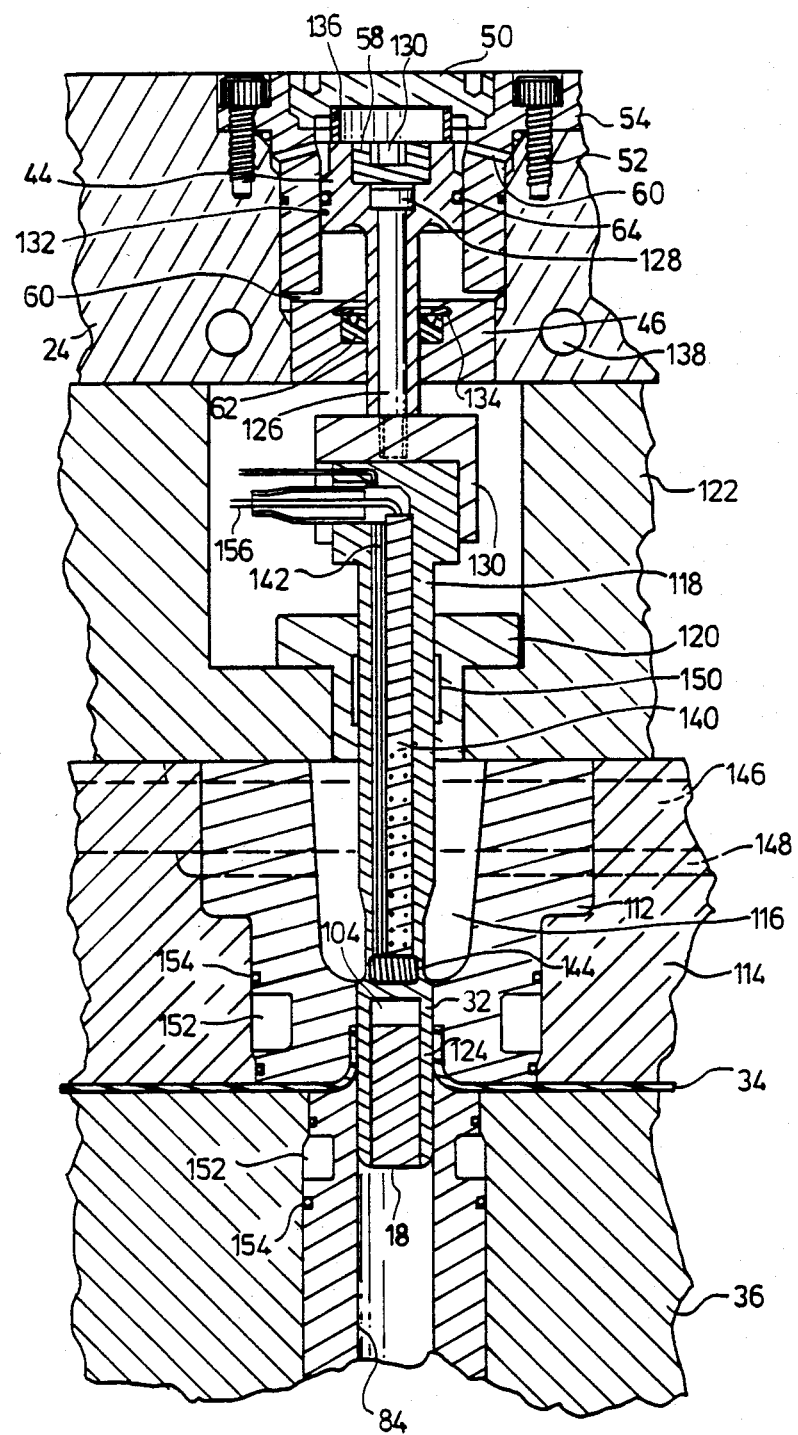
FIG. 5 is a sectional view of a portion of a valve gated injection molding system according to another embodiment of the invention.
Figure 6:
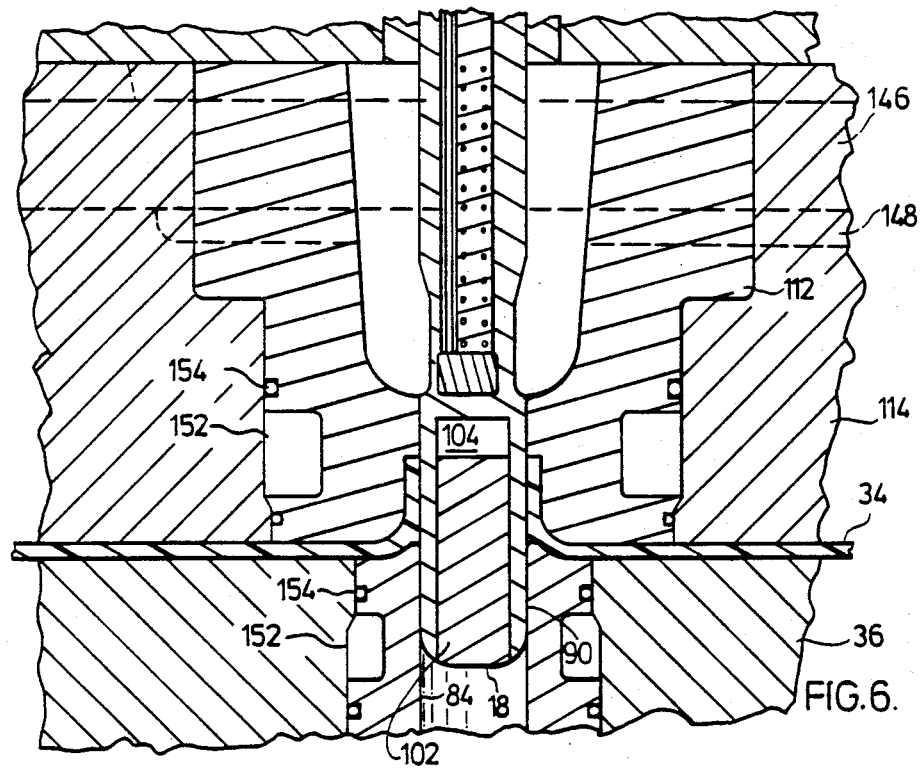
FIG. 6 is an enlarged sectional view of a smaller portion of the system seen in FIG. 5, showing the valve pin in the closed position.
Figure 7:
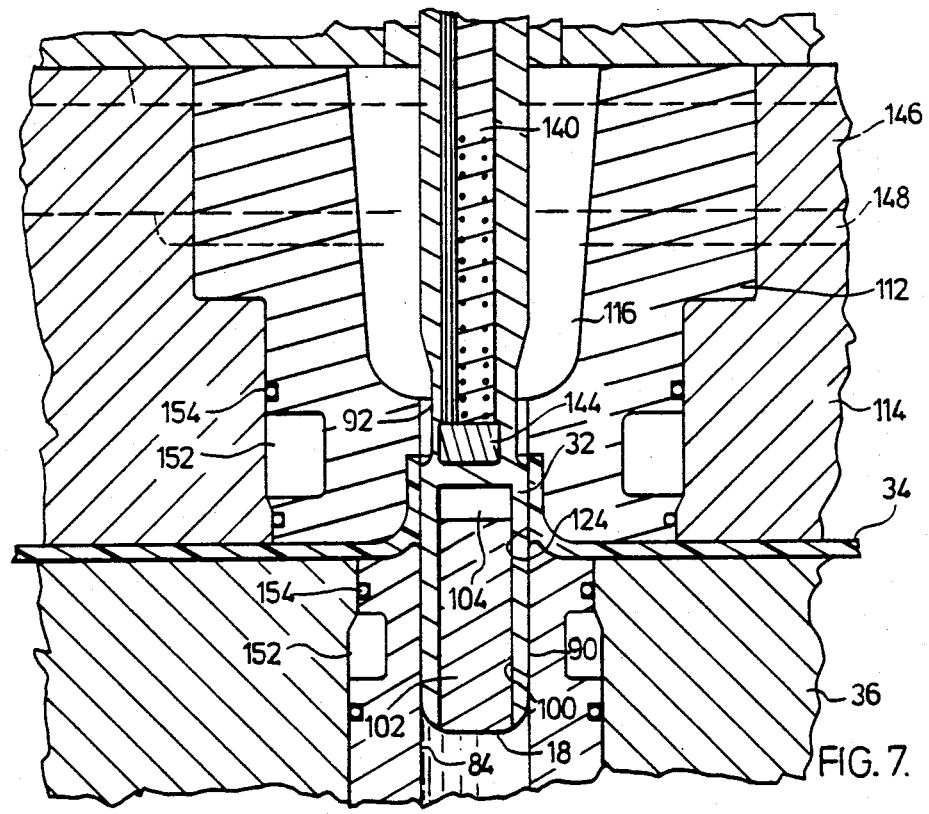
FIG. 7 is a view similar to FIG. 6, showing the valve pin in the open position.

FIGS. 5, 6 and 7 illustrate a somewhat different application of the invention. While some of the elements of this system are different than those described above, the ones that are the same will be referred to by the same reference numerals. This multicavity injection molding system has a gate insert 112 which is seated in a manifold plate 114. The gate insert 112 has a central bore 116 therethrough which extends an elongated valve pin 118. The valve pin 118 is located by a bushing seal 120 seated in a spacer plate 122 in alignment with the gate 32 and an opening 124 through the cavity 34. A screw 126 with a driven end 128 is connected by coupling 130 to the valve pin 118. The valve pin 118 has a tip end 18 which extends forwardly through the gate 32 and through the opening 124 through the cavity and is received in the bore 84 in the movable mold platen 36.

The driven end 128 of the screw 126 connected to the valve pin 118 is engaged by hydraulic actuating mechanism located in the back plate 24. As described above, the actuating mechanism includes a piston 44 which reciprocates in a cylinder 46 seated in the back plate 24. The screw 126 extends through the piston 44 and is secured to it by a plug 58 which is screwed into the piston 44 using a hexagonal wrench which fits into a socket 130. The piston 44 has O-rings 64 seated to provide a seal between it and the inner surface 132 of the cylinder 46. A high temperature seal is provided by a V-shaped flexible ring 62 which is seated around the screw 126 and held in position by an expansion washer 134 seated in a groove. The piston 44 and the valve pin 118 are actuated by applying controlled sources (not shown) of oil (or other hydraulic fluid) to opposite sides of the piston 44 through hydraulic fluid ducts 60. The cylinder 46 has a removable cap 50 against which an abutment sleeve 136 is seated. As may be seen and explained more fully below, the travel of the valve pin 118 in the rearward closed position is limited by this sleeve 136 and this may be adjusted by using a sleeve 136 of a different height. The cylinder 46 has a collar portion 54 which is secured to the back plate 24 by a number of bolts 52. Cooling water lines 138 extend through the back plate 24 to maintain it at a predetermined temperature.

The valve pin 118 is formed of H13 steel, but has a cartridge heater 140 and a thermocouple 142 cast into it with a copper filling 144 generally as described in the applicant's U.S. patent application 453,572 filed Dec. 27, 1982. Another elongated heater 146 is located in the melt passage 148 which extends through the manifold plate 114 and the gate insert 112 to connect to the bore 116 of the gate insert adjacent the valve pin 118. The bushing seal 120 has a circumferential opening 150 extending around the valve pin 118 which initially fills with melt to form a seal. Cooling water at predetermined controlled temperatures flows through conduits 152 in the gate insert 112 and the mold platen 36 and O-ring seals 154 are provided to prevent leakage.

As may clearly be seen in FIGS. 6 and 7, the gate 32 and the opening 124 through the cavity 34 are substantially the same diameter as and in alignment with the mold platen bore 84. As described above, the valve pin 118 has a head portion 90 which is substantially the same diameter and extends from a neck portion 92 with a reduced diameter to the tip end 18. The head portion 90 of the valve pin 118 has a hollow well 100 extending from the tip end 18 and a copper plug 102 is secured in the well 100 adjacent the tip end 18. This leaves an insulative air space 104 extending from the plug 102 to the end of the well near the beginning of the reduced neck portion 92. In this embodiment, the copper plug 102 is secured in the well by heat seating it in place. This is done by first forming the well and the plug to close tolerances and then cooling the plug with dry ice before inserting it into the well.

In use, following assembly of the system as described, electrical power is applied to the cold terminal 156 of the cartridge heater 140 in the valve pin 118 as well as to the heater 146 in the manifold plate 114 to heat them up to predetermined temperatures. Pressurized melt is introduced from a molding machine (not shown) into the melt passage 148 in the manifold plate 114 where it flows around the heater 146 and into the bore 116 of the gate insert 112. The melt then flows along the valve pin 118 to the gate 32. As will be appreciated, the melt flowing next to the heater 146 and the heated valve pin 118 will be maintained in a molten state, but some of the melt around the outside of the melt passage 148 and bore 116 will solidify to provide an additional insulative effect. Pressurized hydraulic fluid applied to the hydraulic fluid ducts 60 controls the operation of the valve pin 118 according to a predetermined cycle. When the valve pin is driven forwardly to the open position shown in FIG. 7, the melt flows through the gate 32 around the neck portion 92 of the valve pin 118 to fill the cavity 34. The junction between the neck portion 92 and the head portion 90 is bevelled to make the flow through this area as smooth as possible. After the cavity 34 is filled, the high injection pressure is held for a short period of time to pack and the valve pin 118 is then actuated to the rearward closed position shown in FIG. 6. The melt pressure is then reduced and, after the melt in the cavity has cooled sufficiently to solidify, the mold is opened and the product ejected. Conventional ejector pins necessary to eject the product from the cavity 34 are not shown for ease of illustration. Similarly, in some cases, it may be necessary to provide the movable mold platen 36 with a slightly undercut collar (not shown) to slightly engage the product sufficiently to withdraw it from the valve pin extending through it.

It is, of course, necessary that the system be capable of running quickly and reliably without plugging or sticking over a long period of time. Depending somewhat upon the type of material being molded and the shape of the product this has not been possible with previous systems in situations where an opening 124 through the product greater than say one third inches in diameter it required. As mentioned above, the problem is that the mass of the head portion 90 becomes so great that after it is closed it is not possible to sufficiently cool it to permit the melt in the surrounding cavity 34 to solidify in the time available. The heat from the head portion of the valve pin must be transferred to the adjacent water cooled mold platen 36, but in previous systems this heat is replaced to some extent by heat conducted forwardly along the valve pin from the neck portion 92. With the present structure, the applicant has found that this problem may be overcome, or at least relieved to a great extent. The provision of the insulative air space 104 greatly reduces the amount of heat flowing into the head portion 90 of the valve pin 118 in the closed position and also reduces the mass of metal which has to be cooled. The provision of the highly conductive copper plug 102 accelerates the transfer of heat away from the area of the cavity to the cooled mold platen 36. The relative sizes of the plug 102 and the air space 104 may be varied for different cooling rates required for different applications and different materials. The cooling rate may also be varied somewhat by adjusting the travel or position of the valve pin in the rearward closed position. The further rearward the head portion 90 is in the closed position, the more of the air space 104 located in the gate 32 and the more of the copper plug located adjacent the cavity and therefore, the faster the melt in the cavity is cooled. Of course, there is a limit in that too much cooling can seal off the nozzle bore 116 adjacent the gate 32 resulting in unacceptable plugging. However, the limit of rearward travel may be quickly and easily adjusted by replacing the abutment sleeve 136 by one of a different height.

Figure 8:
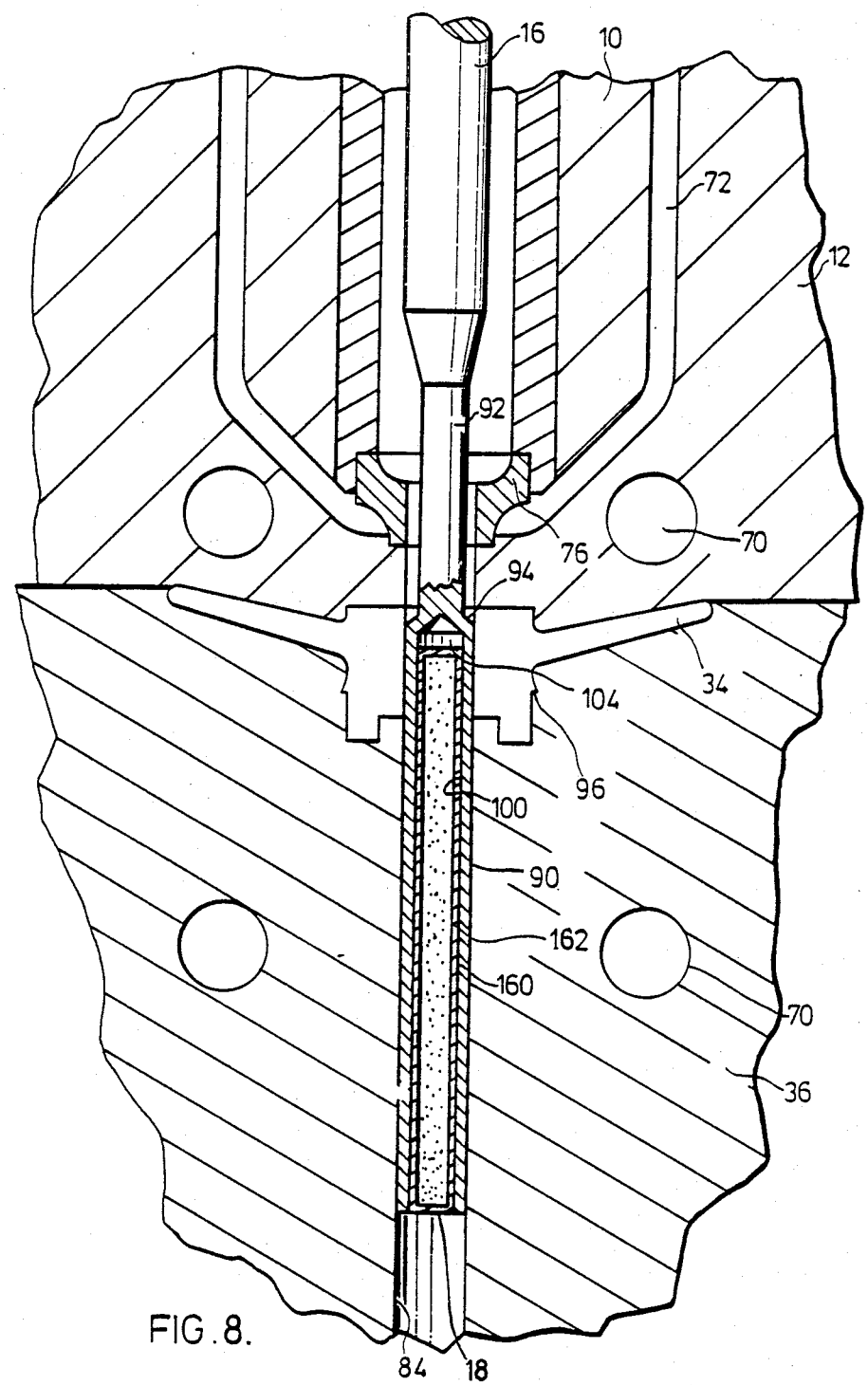
FIG. 8 is a view similar to FIG. 4, showing another embodiment of the invention.

FIG. 8 is a view similar to FIG. 4 showing another embodiment of the invention. In this embodiment, the head portion 90 of the valve pin is formed with a highly conductive heat pipe 160 received in the well 100 rather than the copper plug. As may be seen, the heat pipe 160 is formed of a hollow titanium tube 162 which is partially filled with deionized, degassed, distilled water under a partial vacuum. The tube 162 is brazed in place in the well 100 to leave the air space 104 between the heat pipe 160 and the neck portion 92 of the valve pin. It is apparent that the tube 162 may be formed of other suitable materials and that other fluids may be sealed in it depending upon the application according to well known heat pipe technology.

In use, the system operates generally the same as described above in regard to FIGS. 3 and 4. However, in this case, the heat from the melt vaporizes the water in the tube 162 and the vapour pressure cases it to circulate towards the tip end 18 where it is cooled from the cool mold platen 36. As is well known, circulation is very rapid and results in heat being transferred quickly along the heat pipe 160 with a minimum temperature drop along its length. Thus, maximum cooling is provided to the part adjacent the valve pin, and the air space 104 provides thermal separation from the neck portion of the valve pin.

Although the description of this core ring gated injection molding system has only been given with respect to particular embodiments, it is not to be construed in a limiting sense. Variations and modifications will occur to those skilled in the art. For instance, the system components may be made of alternate suitable materials and other types of manifolds, nozzles and actuating mechanism may be used. Therefore, for a definition of the invention, reference is made to the attached claims.

What I claim is:

1. In an injection molding system for filling a cavity defined between a cool cavity plate and a cool movable mold platen with an opening therethrough, an elongated valve pin with a tip end which extends through a gate leading to the cavity, through the cavity, and into a bore in the movable mold platen, the gate, the opening through the cavity, and the bore in the movable mold platen being in alignment and substantially equal in diameter, valve pin actuating mechanism which reciprocates the valve pin between a rearward closed position and a forward open position in which the valve pin extends further through the opening through the cavity, a melt passage which extends through a manifold and around the valve pin to convey pressurized melt from a molding machine to the gate, the valve bin having an elongated head portion adjacent the tip end which extends from a reduced neck portion, the head portion being substantially equal in diameter to the gate, the opening through the cavity, and the bore in the movable mold platen, the reduced neck portion extending past the gate in the open position to provide for the flow of pressurized melt into the cavity, the improvement wherein the gate extends through a land in the cooled cavity plate and the head portion of the valve pin extends a considerable distance through the cavity into the bore in the movable mold platen, whereby in the retracted closed position contact between the head portion of the valve pin and the surrounding land of the cool cavity plate provides thermal separation between the hot neck portion of the valve pin and the head portion of the valve pin extending through the cavity, and sufficient contact is provided between the movable mold platen and head portion of the valve pin received in said bore to rapidly cool the melt surrounding the valve pin in the cavity.

2. A system as claimed in claim 1 wherein the valve pin is formed of steel.

3. A system as claimed in claim 1 wherein the head portion of the valve pin has a hollow portion adjacent the neck portion thereof.

4. A system as claimed in claim 3 wherein the head portion of the valve pin has a central portion extending between the hollow portion and the tip end formed of a highly conductive metal.

5. A system as claimed in claim 4 wherein the highly conductive metal is copper.

6. A system as claimed in claim 4 wherein the head portion of the valve pin has a central well extending from the tip end, and a beryllium copper plug is seated in the well adjacent the tip end.

7. A system as claimed in claim 6 wherein the plug is heat seated in the well.

8. A system as claimed in claim 7 wherein the diameter of the head portion of the valve pin is greater than one half inch.

9. A system as claimed in claim 3 wherein the head portion of the valve pin has a central portion extending between the hollow portion and the tip end formed of a highly conductive heat pipe.

10. A system as claimed in claim 8 further including adjustable stop means to limit the rearward travel of the valve pin to the closed position, whereby the amount of heat loss through the head portion of the valve pin may be varied.

11. A system as claimed in claim 10 wherein the stop means comprises an abutment sleeve of a particular height located in the actuator means.

12. In an injection molding system for filling a cavity defined between a cool cavity plate and a cool movable mold platen with an opening therethrough, an elongated valve pin with a tip end which extends through a gate leading to the cavity, through the cavity, and into a bore in the movable mold platen, the gate, the opening through the cavity, and the bore in the movable mold platen being in alignment and substantially equal in diameter, valve pin actuating mechanism which reciprocates the valve pin between a rearward closed position and a forward open position in which the valve pin extends further through the opening through the cavity, a melt passage which extends through a manifold and around the valve pin to convey pressurized melt from a molding machine to the gate, the valve pin having an elongated head portion adjacent the tip end which extends from a reduced neck portion, the head portion being substantially equal in diameter to the gate, the opening through the cavity, and the bore in the movable mold platen, the reduced neck portion extending past the gate in the open position to provide for the flow of pressurized melt into the cavity, the improvement wherein the gate extends through a land in the cooled cavity plate and the head portion of the valve pin extends a considerable distance through the cavity into the bore in the movable mold platen, the head portion of the valve pin having a hollow portion adjacent the neck portion thereof such that the hollow portion does not extend above the gate when the valve pin is in the retracted position and does not extend into the bore when the valve pin is in the open position, whereby in the retracted closed positon contact between the head portion of the valve pin and the surrounding land of the cool cavity plate provides thermal separation between the hot neck portion of the valve pin and the head portion of the valve pin extending through the cavity, and sufficient contact is provided between the movable mold platen and head portion of the valve pin received in said bore to rapidly cool the melt surrounding the valve pin in the cavity.

* * * * *